(12) United States Patent
Wu et al.

(10) Patent No.: US 12,737,094 B2
(45) Date of Patent: Sep. 15, 2026

(54) INFORMATION INTERACTION METHOD, ELECTRONIC DEVICE, AND STORAGE MEDIUM

(71) Applicant: Beijing Zitiao Network Technology Co., Ltd., Beijing (CN)

(72) Inventors: Peipei Wu, Beijing (CN); Liyue Ji, Beijing (CN); Liangyong Luan, Beijing (CN); Ruixi Chang, Beijing (CN); Yang Wu, Beijing (CN); Yan Zhao, Beijing (CN); Xiaolin Li, Beijing (CN); Xiaolin Cui, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/834,880

(22) PCT Filed: Jun. 8, 2023

(86) PCT No.: PCT/CN2023/099061
§ 371 (c)(1),
(2) Date: Jul. 31, 2024

(87) PCT Pub. No.: WO2024/012106
PCT Pub. Date: Jan. 18, 2024

(65) Prior Publication Data

US 2025/0021203 A1 Jan. 16, 2025

(30) Foreign Application Priority Data

Jul. 14, 2022 (CN) ......................... 202210833922.5

(51) Int. Cl.
*G06F 3/04815* (2022.01)
*G06F 3/0346* (2013.01)
(Continued)

(52) U.S. Cl.
CPC ........ *G06F 3/04815* (2013.01); *G06F 3/0487* (2013.01); *G06T 13/20* (2013.01); *G06F 3/0346* (2013.01)

(58) Field of Classification Search
CPC .. G06F 3/04815; G06F 3/0487; G06F 3/0346; G06F 3/011; G06F 3/01;
(Continued)

(56) References Cited

U.S. PATENT DOCUMENTS

| | | | |
|---|---|---|---|
| 6,437,777 B1 | 8/2002 | Kamachi et al. | |
| 9,342,610 B2 * | 5/2016 | Liu | G06F 3/013 |

(Continued)

FOREIGN PATENT DOCUMENTS

| | | |
|---|---|---|
| CN | 109710056 A | 5/2019 |
| CN | 111083570 A | 4/2020 |

(Continued)

OTHER PUBLICATIONS

International Search Report and Written Opinion received for PCT Patent Application No. PCT/CN2023/099061, mailed on Sep. 12, 2023, 9 pages (3 pages of English Translation and 6 pages of Original Document).

(Continued)

*Primary Examiner* — Benyam Ketema

(57) ABSTRACT

An information interaction method, an electronic device, and a storage medium are provided. The method includes: displaying a virtual reality space, the virtual reality space including a video image display space for displaying a video image; determining a target message in response to a message sending operation; determining a message movement start point of the target message based on the message sending operation; and moving the target message in the virtual reality space based on the message movement start point.

20 Claims, 4 Drawing Sheets

(51) Int. Cl.
*G06F 3/0487* (2013.01)
*G06T 13/20* (2011.01)

(58) Field of Classification Search
CPC ....... G06F 9/451; G06T 13/20; G06T 15/005; G06T 19/00
See application file for complete search history.

(56) References Cited

U.S. PATENT DOCUMENTS 9,760,790 B2* 9/2017 Novak .................... G06F 3/011
10,082,671 B2* 9/2018 Aruga .................... G06F 3/011
10,990,240 B1* 4/2021 Ravasz .................... G06F 3/011
11,022,794 B2* 6/2021 Sztuk .................... G06F 3/011
11,023,093 B2* 6/2021 Faulkner ............. G06F 3/04845
11,205,305 B2* 12/2021 Sadi .................... H04N 13/183
11,262,588 B2* 3/2022 Miller, IV ............. G06T 19/006
12,130,998 B1* 10/2024 Roben .................... G06F 3/011
2011/0205242 A1* 8/2011 Friesen .................. G06F 3/011 345/633
2014/0204002 A1* 7/2014 Bennet .................. G06F 3/017 345/7
2015/0243079 A1* 8/2015 Cho .................... G02B 27/017 345/633
2016/0027218 A1* 1/2016 Salter ................. G02B 27/0093 345/633
2016/0086379 A1* 3/2016 Sadi .................. G02B 27/0093 345/633
2016/0093105 A1 3/2016 Rimon et al.
2016/0217612 A1* 7/2016 Petill ......................... G06T 7/70
2017/0038837 A1 2/2017 Faaborg et al.
2017/0061696 A1* 3/2017 Li ......................... G02B 27/017
2017/0192620 A1* 7/2017 Kim .................. G02B 27/0179
2017/0221180 A1* 8/2017 Nakashima ............. G06F 1/163
2017/0256096 A1* 9/2017 Faaborg ................ G06T 19/003
2017/0307889 A1* 10/2017 Newman ................. G06F 3/017
2018/0095618 A1 4/2018 Valdivia et al.
2018/0173401 A1* 6/2018 Kim .................... G06F 3/04815
2018/0288354 A1* 10/2018 Anderson ............... G06T 11/60
2019/0188450 A1 6/2019 Spivack et al.
2019/0243445 A1* 8/2019 Kuwatani ............... A63F 13/87
2019/0250699 A1* 8/2019 Mulase ............... G06F 3/04842
2019/0279015 A1* 9/2019 Lin ........................... G06T 3/60
2019/0339837 A1* 11/2019 Furtwangler ........... G06F 3/014
2020/0258481 A1* 8/2020 Woo ........................ G06T 11/00
2020/0371673 A1* 11/2020 Faulkner ................. G06F 3/017
2020/0410962 A1* 12/2020 Kim ..................... H04N 21/816
2021/0286179 A1* 9/2021 Miller, IV ............... G06F 3/013
2022/0165013 A1* 5/2022 Velez .................... A63F 13/213
2022/0197027 A1 6/2022 Goodrich et al.
2022/0236790 A1* 7/2022 Sun ......................... G06F 3/011
2023/0135420 A1* 5/2023 Lee ..................... G06F 3/04817 345/156
2023/0138046 A1* 5/2023 Yabe ....................... A63F 13/87 345/473
2023/0252706 A1* 8/2023 Yabe .................... G06V 40/176 345/473
2024/0281108 A1* 8/2024 Krivoruchko ....... G06F 3/04815

FOREIGN PATENT DOCUMENTS

CN 111258420 A 6/2020
CN 111897483 A 11/2020
CN 112817444 A 5/2021
CN 113849117 A 12/2021
CN 113905251 A 1/2022
CN 114296844 A 4/2022
CN 114401414 A 4/2022
WO 2018/086572 A1 5/2018
WO 2022/022575 A1 2/2022

OTHER PUBLICATIONS

Office action received from Chinese patent application No. 202210833922.5 mailed on Apr. 9, 2026, 16 pages (8 pages English Translation and 8 pages Original Copy).

* cited by examiner

INFORMATION INTERACTION METHOD, ELECTRONIC DEVICE, AND STORAGE MEDIUM

CROSS-REFERENCE TO RELATED APPLICATION

This application is a continuation of International Patent Application No. PCT/CN2023/099061, filed on Jun. 8, 2023, which claims the priority to and benefits of the Chinee Patent Application, No. 202210833922.5, which was filed on Jul. 14, 2022. All the aforementioned patent applications are hereby incorporated by reference in their entireties.

TECHNICAL FIELD

The present disclosure relates to the field of computer technologies, and in particular, to an information interaction method and apparatus, an electronic device, and a storage medium.

BACKGROUND ART

With the development of virtual reality (VR) technology, an increasing number of virtual live-streaming platforms or applications have been developed for use by users. In the virtual live-streaming platforms, a user may view performances of a live streamer via, for example, a head-mounted display device and related accessories, and may interact with the live streamer and other viewers using emojis and bullet comments. However, in the related art, the emojis and the bullet comments have a poor display effect in the virtual live-streaming platforms, and fail to provide strong interactivity, resulting in a poor user experience.

SUMMARY

The summary of the present disclosure is provided to give a brief overview of concepts, which will be described in detail later in the section Detailed Description of the present disclosure. The summary is neither intended to identify key or necessary features of the claimed technical solutions, nor is it intended to be used to limit the scope of the claimed technical solutions.

In the first aspect, according to one or more embodiments of the present disclosure, there is provided an information interaction method, which includes:

- displaying a virtual reality space, the virtual reality space including a video image display space for displaying a video image;
- determining a target message in response to a message sending operation;
- determining a message movement start point of the target message based on the message sending operation; and
- moving the target message in the virtual reality space based on the message movement start point.

In the second aspect, according to one or more embodiments of the present disclosure, there is provided an information interaction apparatus, which includes a space display unit, a message determination unit, a start point determination unit and a message movement unit.

The space display unit is configured to display a virtual reality space, and the virtual reality space includes a video image display space for displaying a video image.

The message determination unit is configured to determine a target message in response to a message sending operation.

The start point determination unit is configured to determine a message movement start point of the target message based on the message sending operation.

The message movement unit is configured to move the target message in the virtual reality space based on the message movement start point.

In the third aspect, according to one or more embodiments of the present disclosure, there is provided an electronic device, which includes at least one memory and at least one processor. The memory is configured to store program codes, and the processor is configured to call the program codes stored in the memory to cause the electronic device to execute the information interaction method provided according to one or more embodiments of the present disclosure.

In the fourth aspect, according to one or more embodiments of the present disclosure, there is provided a non-transitory computer storage medium, the non-transitory computer storage medium stores program codes, and when the program codes are executed by a computer device, the computer device is caused to execute the information interaction method provided according to one or more embodiments of the present disclosure.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION

Figure 1:
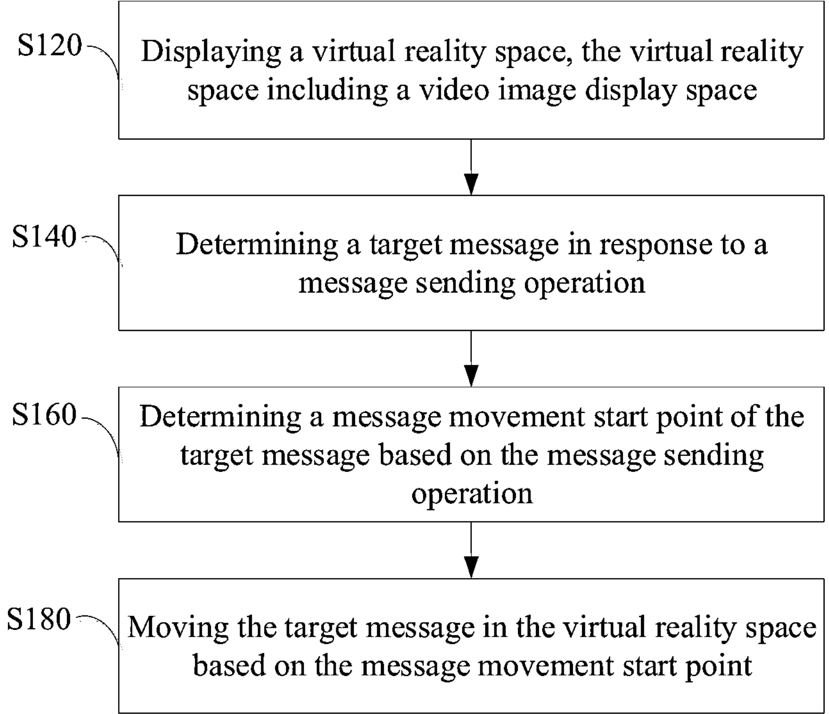
FIG. 1 is a flowchart of an information interaction method according to an embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the steps described in the implementations of the present disclosure may be performed in different orders, and/or performed in parallel. Furthermore, additional steps may be included and/or the execution of the illustrated steps may be omitted in the implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". The term "in response to" and a related term mean that a signal or event is affected by another signal or event to an extent, but is not necessarily fully or directly affected. When an event x occurs "in response to" an event y, x may respond directly or indirectly to y. For example, the occurrence of y may finally lead to the occurrence of x, but there may be other intermediate events and/or conditions. In other situations, the occurrence of y may not necessarily lead to the occurrence of x, that is, even if y has not occurred, x may occur. Moreover, the term "in response to" may also mean "at least partially in response to".

The term "determine" broadly encompasses a wide variety of actions, which may include obtaining, computing, calculating, processing, deriving, investigating, looking up (e.g., looking up in a sheet, a database, or other data structures), ascertaining, or similar actions, and may further include receiving (e.g., receiving information), accessing (e.g., accessing data in a memory), or similar actions, and parsing, selecting, choosing, establishing, and similar actions, and the like. Related definitions of the other terms will be given in the description below. Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

For the purpose of the present disclosure, the phrase "A and/or B" means (A), (B), or (A and B).

The names of messages or information exchanged between a plurality of apparatuses in the implementations of the present disclosure are used for illustrative purposes only, and are not used to limit the scope of these messages or information.

Referring to FIG. 1, FIG. 1 is a flowchart of an information interaction method 100 according to an embodiment of the present disclosure. The method 100 includes step S120 to step S180.

Step S120: displaying a virtual reality space, the virtual reality space including a video image display space.

The virtual reality space may be a simulated environment with respect to a real world, a semi-simulated and semi-fictional virtual scene, or a purely fictional virtual scene. The virtual scene may be any one of a two-dimensional virtual scene, a 2.5-dimensional virtual scene, or a three-dimensional virtual scene. A dimensionality of the virtual scene is not limited in the embodiments of the present application. For example, the virtual scene may include sky, land, sea, etc., and the land may include environmental elements such as a desert and a city. A user may control a virtual object to move in the virtual scene.

Figure 2:
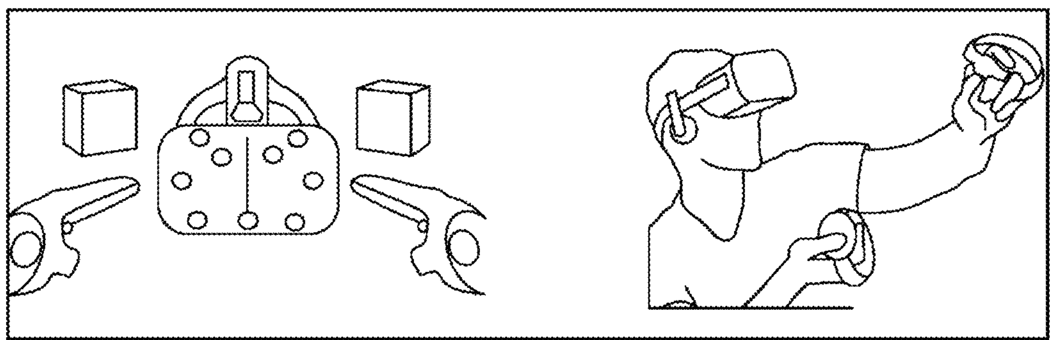
FIG. 2 is a schematic diagram of a virtual reality device according to an embodiment of the present disclosure.

Referring to FIG. 2, a user may enter a virtual reality space via an intelligent terminal device such as head-mounted VR glasses, and control his/her own virtual character (Avatar) in the virtual reality space to implement social interaction with virtual characters controlled by other users, entertainment, learning, telecommuting, etc.

In an embodiment, the user may implement a related interactive operation in the virtual reality space via a controller, and the controller may be a gamepad. For example, the user may perform related operation control through an operation on buttons of the gamepad, and may also control a target object in a virtual reality device by using a gesture, speech, or multimodal control rather than a controller.

The information interaction method provided by one or more embodiments of the present disclosure employs an extended reality (XR for short) technology. The extended reality technology can combine reality with virtuality through a computer to provide the user with a virtual reality space that allows for human-computer interaction. In the virtual reality space, the user may implement social interaction, entertainment, learning, working, telecommuting, creating user generated content (UGC), etc., via the virtual reality device such as a head mount display (HMD).

The virtual reality device described in this embodiment of the present disclosure may include, but is not limited to, the following types: a personal computer virtual reality (PCVR) device, a mobile virtual reality device and an integrated virtual reality device.

The personal computer virtual reality (PCVR) device performs computation related to a virtual reality function and data output by using a PC, and an external personal computer virtual reality device achieves virtual reality effects by using data output by the PC.

The mobile virtual reality device supports to set a mobile terminal (e.g., a smartphone) in various manners (e.g., a head-mounted display provided with a special slot), and is connected to the mobile terminal in a wired or wireless manner, where the mobile terminal performs computation related to a virtual reality function, and outputs data to the mobile virtual reality device, for example, a virtual reality video is watched through an APP of the mobile terminal.

The integrated virtual reality device has a processor configured to perform computation related to a virtual reality function, and therefore has an independent virtual reality input and output function, with no need to be connected to a PC or a mobile terminal, and has a high degree of freedom of use.

Of course, the implementation form of the virtual reality device is not limited thereto, and the virtual reality device may be further miniaturized or enlarged as needed.

A posture detection sensor (e.g., a nine-axis sensor) is provided in the virtual reality device for detecting a posture change of the virtual reality device in real time. In response to a user wearing the virtual reality device, a real-time posture of the head of the user is transmitted to a processor when a posture of the head of the user changes, so as to calculate a fixation point of a line of sight of the user in a virtual environment, and calculate an image in a fixation range of the user (i.e., a virtual field of view) in a three-dimensional model of the virtual environment based on the fixation point. The image is displayed on a display screen, providing immersive experience that the user feels like watching in the real environment.

Figure 3:
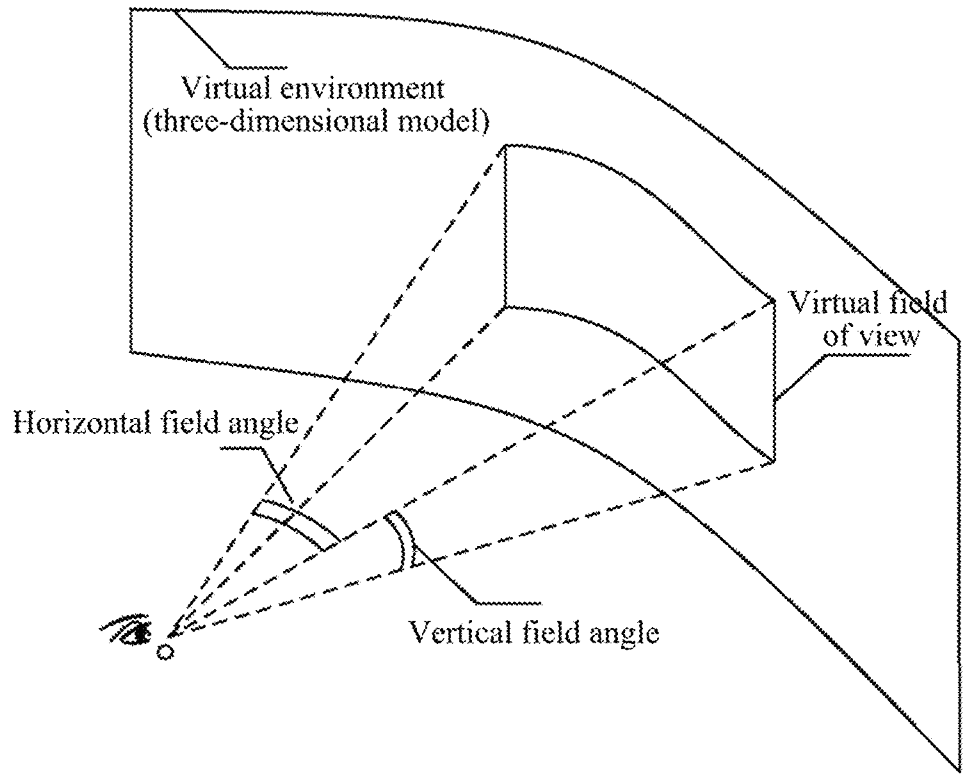
FIG. 3 is an optional schematic diagram of a virtual field of view of a virtual reality device according to an embodiment of the present disclosure.

FIG. 3 is an optional schematic diagram of a virtual field of view of a virtual reality device according to an embodiment of the present disclosure. A distribution range of the virtual field of view in the virtual environment is described by using a horizontal field angle and a vertical field angle, where the distribution range in a vertical direction is represented by the vertical field angle BOC, and the distribution range in a horizontal direction is represented by the horizontal field angle AOB. A human eye is always able to perceive, through a lens, an image in the virtual environment that is located in the virtual field of view. It can be understood that a larger field angle means a larger virtual field of view, which allows the user to perceive a larger region of the virtual environment. The field angle represents a distribution range of a viewing angle formed when the environment is perceived through the lens. For example, a field angle of the virtual reality device represents a distribution range of a viewing angle of the human eye formed when the virtual environment is perceived through a lens of the virtual reality device. For another example, for a mobile terminal configured with a camera, a field angle of the camera is a distribution range of a viewing angle formed when the camera perceives a real environment for shooting.

The virtual reality device, such as an HMD, is integrated with a number of cameras (e.g., a depth camera, an RGB camera, etc.), and the purpose of the cameras are not limited to providing pass-through views. A camera image and an integrated inertial measurement unit (IMU) provide data that may be processed by a computer vision method to automatically analyze and understand the environment. In addition, the HMD is designed to support not only passive computer vision analysis but also active computer vision analysis. In passive computer vision methods, image information captured from the environment is analyzed. The methods may be monoscopic (images from a single camera) or stereoscopic (images from two cameras). The methods include, but are not limited to, feature tracking, object recognition, and depth estimation. In active computer vision methods, information is added to the environment by projecting patterns that are visible to the camera but not necessarily visible to a human visual system. Such techniques include a time-of-flight (ToF) camera, laser scanning, or structured light to simplify the stereo matching problem. Active computer vision is used for implementing scene depth reconstruction.

In some embodiments, the virtual reality space includes a virtual live-streaming space. In the virtual live-streaming space, a performing user may perform live-streaming in a virtual image or in a real image, and a viewing user may control a virtual character to watch the live performance of the performing user from a viewing angle such as a first-person view or a third-person view.

In some embodiments, a video stream may be obtained, and a video content is presented in the video image display space based on the video stream. Exemplarily, coding formats such as H.265, H.264, and MPEG-4 may be used for the video stream. In a specific implementation, a client may receive a live video stream sent by a server and display a live video image in the video image display space based on the live video stream.

In some embodiments, the video image display space displays a 3D (stereoscopic) video by default. A 3D video technology that utilizes a visual disparity between human eyes, includes but is not limited to, a rectangular 3D video, a semi-panoramic 3D video, a panoramic 3D video, or a fisheye 3D video.

Step S140: determining a target message in response to a message sending operation.

In some embodiments, the target message includes, but is not limited to, a text message (e.g., a comment or a bullet comment) and an image message (e.g., an emoji, a picture, a virtual item, etc.).

In some embodiments, the target message may be a message edited for the message sending operation, a message selected for the message sending operation, a message associated with the message sending operation, or a message randomly assigned by a system in response to the message sending operation.

In a specific implementation, the user may invoke a message editing interface through a preset operation, select a candidate target message from the message editing interface or edit a customized target message, and send the target message, and the target message sent by the current user is displayed in the virtual reality space.

The message sending operation is used for sending the target message. Exemplarily, the message sending operation includes, but is not limited to, a somatosensory control operation, a gesture control operation, an eye movement operation, a touch control operation, a speech control instruction, or an operation (e.g., a button operation) on an external control device.

In a specific implementation, the user may select an existing candidate target message from a message editing interface displayed in the virtual reality space or edit a customized target message, and send the target message, and the target message sent by the current user is displayed in a target message display space. Exemplarily, the message editing interface may be displayed in the virtual reality space in advance, or may be invoked based on a preset operation. The message editing interface may be used for editing the target message, or for directly displaying one or more preset candidate target messages for direct selection by the user. For example, the message editing interface may be a message panel (e.g., for an emoji panel).

In some embodiments, the message editing interface may be a preset region in the virtual reality space for displaying one or more candidate target messages.

In another specific implementation, the message sending operation may include a preset user operation with respect to the virtual reality control device, such as triggering a preset button of the virtual reality control device (e.g., a gamepad). Exemplarily, the preset button may be associated with a preset target message. When the user triggers the preset button, the target message may be sent. Alternatively, when the user triggers the preset button, the system randomly assigns a target message for the trigger operation.

Step S160: determining a message movement start point of the target message based on the message sending operation.

In this example, based on a specific mode of sending a message, a message movement start point corresponding to the specific mode may be determined.

In some embodiments, when the message sending operation includes an operation with respect to a preset message editing interface displayed in the virtual reality space, the message movement start point of the target message is determined based on a position of the message editing interface in the virtual reality space. The message editing interface may be used for displaying a candidate target message, or for editing a customized target message. However, the present disclosure is not limited thereto.

In a specific implementation, a preset position on the message editing interface, such as a left end, a right end, an upper end, or a lower end of the message editing interface, may be used as the message movement start point. However, the present disclosure is not limited thereto.

In some embodiments, when the message sending operation includes an operation with respect to a virtual reality control device, the message movement start point of the target message is determined based on a position of the virtual reality control device (e.g., a VR gamepad) in the virtual reality space.

In a specific implementation, a relative positional relationship between the VR gamepad and a head-mounted VR device may be acquired, and the position of the VR gamepad in the virtual reality space may be determined based on the relative positional relationship. Exemplarily, an infrared light source may be provided on a housing of the VR gamepad, and the head-mounted VR device is provided with a binocular infrared camera for capturing the infrared light source. Posture information of the VR gamepad and the head-mounted VR device is measured separately. The relative positional relationship between the VR gamepad and the head-mounted VR device is calculated based on the posture information of the VR gamepad and the head-mounted VR device and picture information captured by the binocular infrared camera. Then, the position of the VR gamepad in the virtual reality space is determined based on a position of the head-mounted VR device in the virtual reality space and the relative positional relationship between the VR gamepad and the head-mounted VR device.

It should be noted that other related technical solutions in the art may also be used to determine the position of the VR gamepad in the virtual reality space, which is not limited herein in the present disclosure.

In a specific implementation, a counterpart (e.g., an animation model) of the virtual reality control device may be displayed in the virtual reality space, such that the target message may be moved by serving the counterpart as a start point. However, the present disclosure is not limited thereto.

Step S180: moving the target message in the virtual reality space based on the message movement start point.

In some embodiments, when the user sends the target message, the target message may be moved towards a preset position by serving the message movement start point as an initial movement start point.

According to one or more embodiments of the present disclosure, by displaying the virtual reality space including the video image display space, determining the target message in response to the message sending operation, and determining the message movement start point of the target message based on the message sending operation, the target message may be moved in the virtual reality space based on the message movement start point. Thus, the diversity of message sending can be increased, the adaptation to interaction logic of virtual reality can be enhanced, and the interactivity of the virtual reality space can be improved.

In some embodiments, the method 100 further includes the following step.

Step S170: determining a message movement end point of the target message in response to the message sending operation.

Accordingly, the step S180 further includes: moving the target message in the virtual reality space based on the message movement start point and the message movement end point.

In some embodiments, the virtual reality space further includes the target message display space, and the message movement end point is located in the target message display space. The target message display space is a region used for displaying the target message in the virtual reality space.

In some embodiments, the target message display space is located in front of the video image display space in the first direction, and the first direction is a direction in which the video image is oriented.

Figure 4:
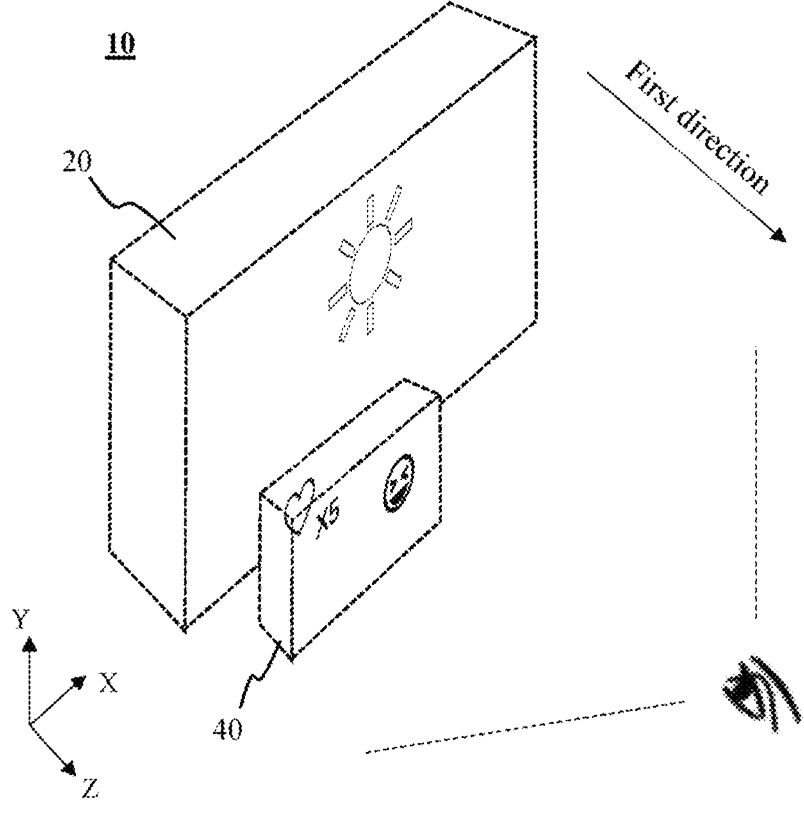
FIG. 4 is a schematic diagram of a virtual reality space according to an embodiment of the present disclosure.

Referring to FIG. 4, FIG. 4 is a schematic diagram of a virtual reality space according to an embodiment of the present disclosure. The virtual reality space 10 includes a video image display space 20 and a target message display space 40. The video image display space 20 may be used for displaying the video image, such as a 3D video image. The target message display space 40 is located in front of the video image display space in the first direction (i.e., a direction of a Z axis shown in FIG. 4), and the first direction is the direction in which the video image is oriented, i.e., opposite to a viewing direction in which the user watches the front video image. In this embodiment, a viewing distance of the user corresponding to the target message display space is shorter than a viewing distance corresponding to the video image display space, so as to represent a visual effect that the target message is closer and the video image is farther.

According to one or more embodiments of the present disclosure, in the virtual reality space, the target message display space is located in front of the video image display space in the direction in which the video image is oriented, which causes that the viewing distance of the user corresponding to the target message display space is shorter than the viewing distance corresponding to the video image display space. Therefore, the target message can be independent of the video image, improving the sense of spatial hierarchy in viewing, solving the problem of ghosting occurring when the target message and the 3D video image coexist, and avoiding the difficulty in focusing by the user.

In some embodiments, an orthographic projection of the target message display space on the video image display space is located outside a preset central region of the video image display space.

Figure 5:
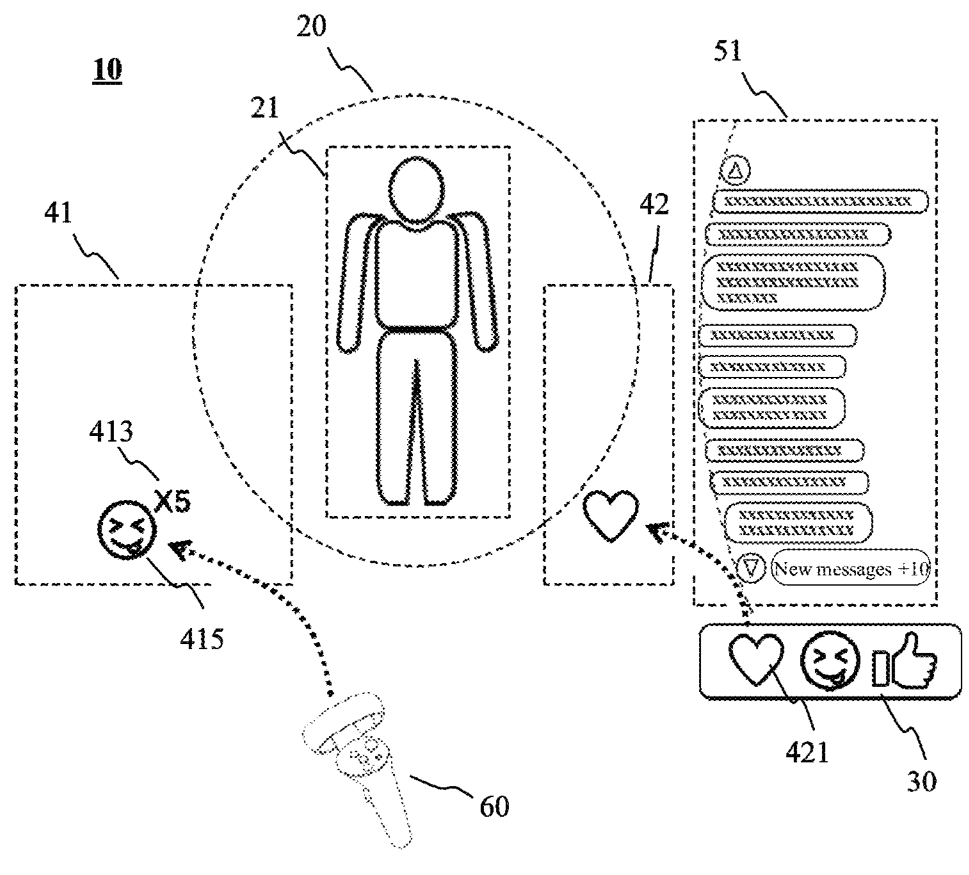
FIG. 5 is a schematic diagram of a virtual reality space according to another embodiment of the present disclosure.

FIG. 5 is a schematic diagram of a virtual reality space according to an embodiment of the present disclosure, which reflects the virtual reality space presented in a viewing angle of the user when the user views the video image from the front. Referring to FIG. 5, the virtual reality space 10 includes a video image display space 20, target message display spaces 41 and 42, and a text message display space 51. Orthographic projections of the target message display spaces 41 and 42 and the text message display space 51 on the video image display space 20 are all located outside a preset central region 21, such that the target message display spaces 41 and 42 do not block the preset central region, so as to avoid affecting video viewing experience of the user.

It should be noted that a person skilled in the art may set the position, the shape, and the size of the preset central region according to actual needs, which is not limited herein in the present disclosure.

Referring to FIG. 5, a message editing interface 30 is further displayed in the virtual reality space 10. In the message editing interface 30, a plurality of candidate target emojis are displayed for selection by the user. When the user selects a target emoji 421, the target emoji 421 may be moved into the target message display space 42 by serving a position in the message editing interface 30 as a start point.

When the user triggers the preset button of the virtual reality control device (e.g., the gamepad), a direction to which the virtual reality control device is currently pointing is acquired in response to the preset button being triggered, and a message movement end point of a target message 415 is determined based on the direction to which the virtual reality control device points, so that the target message 415 can be moved by a counterpart 60 of the virtual reality control device in the virtual reality space to the determined message movement end point along a straight line or a curved line.

Exemplarily, when the preset button is triggered, current posture information of the virtual reality control device is acquired, so that the direction to which the virtual reality control device points may be determined based on the posture information.

In some embodiments, the virtual reality space further includes a text message display space and/or a function card display space, and the target message display space does not overlap the text message display space and/or the function card display space.

In some embodiments, in the first direction, the target message display space has a portion that is located behind the text message display space and/or the function card display space, and the first direction is the direction in which the video image is oriented.

The text message display space is used for displaying a text message, and the function card display space is used for displaying one or more function cards that are used for executing preset auxiliary functions. Exemplarily, the function card includes one or more of the following: a function card for displaying viewer information, a function card for displaying performer information, a function card for switching the virtual reality space, a function card for exiting the virtual reality space, and a function card for adjusting video viewing parameters.

According to one or more embodiments of the present disclosure, the target message display space does not partially or completely overlap the text message display space and/or the function card display space, so as to prevent the target message from overlapping the text message or the function card when displaying the target message.

In some embodiments, in the first direction, the target message display space has a portion that is located behind the text message display space and/or the function card display space, and the first direction is the direction in which the video image is oriented. In this embodiment, the target message display space has the portion in the first direction that is located behind the text message display space and/or the function card display space, such that the text message and/or the function card are/is displayed preferentially when the user views the video content from the front.

In some embodiments, a rendering level of the target message is lower than a rendering level of a text message or a function card in the virtual reality space. In this embodiment, the rendering level of the target message is lower than the rendering level of the text message or the function card in the virtual reality space, so that the text message or the function card can be displayed preferentially, avoiding impact of sending of the target message on display of the text message or the function card.

In some embodiments, when the user triggers one or more first message sending operations successively and a time interval between two adjacent first message sending operations does not exceed a preset time interval, the first message sending operations correspond to different first target messages, and the first target messages corresponding to the first message sending operations have different message movement end points.

In a specific implementation, the user may continuously trigger the preset button of the virtual reality control device (e.g., the gamepad), and a time interval between trigger operations does not exceed the preset time interval, then a random target emoji and a random emoji movement end point may be assigned to each trigger operation so as to form an animation effect that emojis are randomly and continuously scattered. Therefore, user experience in interaction can be improved.

When the user triggers one or more first message sending operations successively and a time interval between two adjacent first message sending operations does not exceed a preset time interval, the first message sending operations correspond to identical first target messages, and the first target messages corresponding to the first message sending operations have identical message movement end points.

In some embodiments, when the user triggers one or more first message sending operations successively and a time interval between two adjacent first message sending operations does not exceed a preset time interval, then the first message sending operations correspond to identical first target messages, and the first target messages corresponding to the first message sending operations have identical message movement end points.

In a specific implementation, the user may continuously trigger the preset button of the virtual reality control device (e.g., the gamepad), and a time interval between trigger operations does not exceed the preset time interval, then a same target emoji and a same emoji movement end point can be randomly assigned to each trigger operation so as to form an animation effect that the same emojis continuously fall to the same falling point. Therefore, user experience in interaction can be improved.

In some embodiments, the method 100 further includes the following step.

Step S190: displaying the first identifier in the virtual reality space, the first identifier being used for displaying a number of first target messages currently sent in real time.

Exemplarily, when the user triggers the preset button of the virtual reality control device for the first time, the first target message A is moved to a target message space A and then kept and presented in the target message space for 2 seconds. During this period, when the user triggers the preset button again, an identifier "×2" may be displayed after a new first target message A arrives at the same position, which displays a number of the first target messages A currently continuously triggered in real time. Referring to FIG. 5, the third identifier 413 is displayed with "x5", indicating that the user has continuously triggered five first message sending operations and has sent five target messages 415 accordingly.

In some embodiments, when the user triggers the first message sending operation and the second message sending operation successively and a time interval between the first message sending operation and the second message sending operation is greater than a preset time interval, a message movement path of the first target message corresponding to the first message sending operation is different from a message movement path of the second target message corresponding to the second message sending operation. In this embodiment, the time interval between the first message sending operation and the second message sending operation is greater than the preset time interval, then different message movement paths may be used to indicate that the first message sending operation and the second message sending operation are not continuous operations, which improves message exchange experience of the user.

It should be noted that the target message corresponding to the first message sending operation may be the same as or different from the target message corresponding to the second message sending operation, which is not limited herein in this embodiment.

In some embodiments, after determining the message movement start point and the message movement end point of the target message, an intermediate point may be selected, and a smooth curve (e.g., a Bezier curve) may be generated based on the message movement start point, the intermediate point, and the message movement end point, so as to determine a movement path of the target message from the message movement start point to the message movement end point.

In some embodiments, a preset animation effect may be rendered based on the movement path of the target message. Exemplarily, the movement path of the target message may be rendered by using a particle system of Unity 3D.

Accordingly, according to an embodiment of the present disclosure, an information interaction apparatus is provided, and includes a space display unit, a message determination unit, a start point determination unit and a message movement unit.

The space display unit is configured to display a virtual reality space, the virtual reality space including a video image display space for displaying a video image.

The message determination unit configured to determine a target message in response to a message sending operation.

The start point determination unit configured to determine a message movement start point of the target message based on the message sending operation.

The message movement unit configured to move the target message in the virtual reality space based on the message movement start point.

In some embodiments, when the message sending operation includes an operation with respect to a preset message editing interface displayed in the virtual reality space, the start point determination unit is configured to determine the message movement start point of the target message based on a position of the message editing interface in the virtual reality space.

In some embodiments, when the message sending operation includes an operation with respect to a virtual reality control device, the start point determination unit is configured to determine the message movement start point of the target message based on a position of the virtual reality control device in the virtual reality space.

In some embodiments, the information interaction apparatus further includes an end point determination unit.

The end point determination unit is configured to determine a message movement end point of the target message in response to the message sending operation; and the message movement unit is configured to move the target message in the virtual reality space based on the message movement start point and the message movement end point.

In some embodiments, when the message sending operation includes an operation with respect to a virtual reality control device, the end point determination unit is configured to determine the message movement end point of the target message based on a direction to which the virtual reality control device points.

In some embodiments, the virtual reality space further includes the target message display space, and the message movement end point is located in the target message display space.

In some embodiments, the target message display space is located in front of the video image display space in the first direction, and the first direction is a direction in which the video image is oriented.

In some embodiments, an orthographic projection of the target message display space on the video image display space is located outside a preset central region of the video image display space.

In some embodiments, the virtual reality space further includes a text message display space and/or a function card display space; and the target message display space does not overlap the text message display space and/or the function card display space.

In some embodiments, the target message display space has a portion in the first direction that is located behind the text message display space and/or the function card display space, and the first direction is the direction in which the video image is oriented.

In some embodiments, a rendering level of the target message is lower than a rendering level of a text message or a function card in the virtual reality space.

In some embodiments, when the user triggers one or more first message sending operations successively and a time interval between two adjacent first message sending operations does not exceed a preset time interval, the first message sending operations correspond to different first target messages, and the first target messages have different message movement end points.

In some embodiments, when the user triggers one or more first message sending operations successively and a time interval between two adjacent first message sending operations does not exceed a preset time interval, the first message sending operations correspond to identical first target messages, and the first target messages have identical message movement end points.

In some embodiments, the information interaction apparatus further includes an identifier display unit.

The identifier display unit is configured to display the first identifier in the virtual reality space, and the first identifier is used for displaying a number of first target messages currently sent in real time.

According to one or more embodiments of the present disclosure, when the user triggers the first message sending operation and the second message sending operation successively and a time interval between the first message sending operation and the second message sending operation is greater than a preset time interval, a message movement path of the first target message corresponding to the first message sending operation is different from a message movement path of the second target message corresponding to the second message sending operation.

In some embodiments, the information interaction apparatus further includes an effect rendering unit.

The effect rendering unit is configured to render a preset animation effect based on a movement path of the target message.

The apparatus embodiment is substantially corresponding to the method embodiment, and therefore for a related part, reference may be made to the part of the descriptions of the method embodiment. The apparatus embodiment described above is only illustrative, and the modules described as separate modules therein may or may not be separate. Some or all of the modules may be selected according to actual needs to achieve the objectives of the solutions of the embodiments, which can be understood and implemented by a person of ordinary skill in the art without involving any inventive effort.

Accordingly, according to one or more embodiments of the present disclosure, an electronic device is provided and includes at least one memory and at least one processor.

The memory is configured to store program codes. The processor is configured to call the program codes stored in the memory to cause the electronic device to execute the information interaction method according to one or more embodiments of the present disclosure.

Accordingly, according to one or more embodiments of the present disclosure, a non-transitory computer storage medium is provided. The non-transitory computer storage medium stores program codes that is executed by a computer device, which causes the computer device to execute the information interaction method according to one or more embodiments of the present disclosure.

Figure 6:
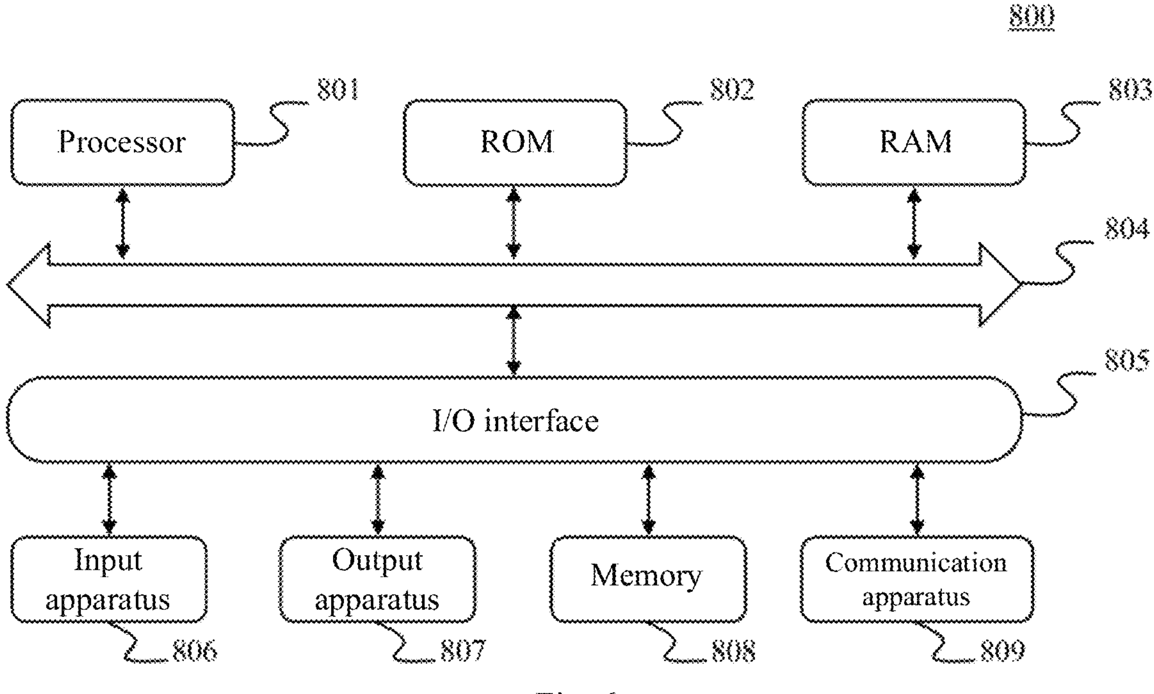
FIG. 6 is a structural schematic diagram of an electronic device according to an embodiment of the present disclosure.

Refer to FIG. 6 below, which illustrated a structural schematic diagram of an electronic device (such as a terminal device or a server) 800 suitable for implementing the embodiments of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 6 is merely an example, and shall not impose any limitation on the function and scope of use of the embodiments of the present disclosure.

As shown in FIG. 6, the electronic device 800 may include a processor (e.g., a central processor or a graphics processor) 801 that may perform a variety of appropriate actions and processing in accordance with a program stored in a read-only memory (ROM) 802 or a program loaded from a memory 808 into a random access memory (RAM) 803. The RAM 803 further stores various programs and data required for operations of the electronic device 800. The processor 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touchscreen, a touchpad, a keyboard, a mouse, a camera, a microphone, an accelerometer, and a gyroscope; an output apparatus 807 including, for example, a liquid crystal display (LCD), a speaker, and a vibrator; the memory 808 including, for example, a tape and a hard disk; and a communication apparatus 809. The communication apparatus 809 may allow the electronic device 800 to perform wireless or wired communication with other devices to exchange data. Although FIG. 6 shows the electronic device 800 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded and installed from a network through the communication apparatus 809, installed from the memory 808, or installed from the ROM 802. When the computer program is executed by the processor 801, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as the Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the above method according to the present disclosure.

The computer program code for performing the operations in the present disclosure may be written in one or more programming languages or a combination thereof, where the programming languages include an object-oriented programming language, such as Java, Smalltalk, or C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. The name of a unit does not constitute a limitation on the unit itself under certain circumstances.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) or a flash memory, an optic fiber, a portable compact disk read-only memory (CD-ROM), an optical storage device, a magnetic storage device, or any suitable combination thereof.

According to one or more embodiments of the present disclosure, an information interaction method is provided and includes: displaying a virtual reality space, the virtual reality space including a video image display space for displaying a video image; determining a target message in response to a message sending operation; determining a message movement start point of the target message based on the message sending operation; and moving the target message in the virtual reality space based on the message movement start point.

According to one or more embodiments of the present disclosure, when the message sending operation includes an operation with respect to a preset message editing interface displayed in the virtual reality space, the determining a message movement start point of the target message includes: determining the message movement start point of the target message based on a position of the message editing interface in the virtual reality space.

According to one or more embodiments of the present disclosure, when the message sending operation includes an operation with respect to a virtual reality control device, the determining a message movement start point of the target message includes: determining the message movement start point of the target message based on a position of the virtual reality control device in the virtual reality space.

The information interaction method according to one or more embodiments of the present disclosure further includes: determining a message movement end point of the target message in response to the message sending operation; and the moving the target message in the virtual reality space based on the message movement start point includes: moving the target message in the virtual reality space based on the message movement start point and the message movement end point.

According to one or more embodiments of the present disclosure, when the message sending operation includes an operation with respect to a virtual reality control device, the determining a message movement end point of the target message includes: determining the message movement end point of the target message based on a direction to which the virtual reality control device points.

According to one or more embodiments of the present disclosure, the virtual reality space further includes a target message display space, and the message movement end point is located in the target message display space.

According to one or more embodiments of the present disclosure, the target message display space is located in front of the video image display space in the first direction, and the first direction is a direction in which the video image is oriented.

According to one or more embodiments of the present disclosure, an orthographic projection of the target message display space on the video image display space is located outside a preset central region of the video image display space.

According to one or more embodiments of the present disclosure, the virtual reality space further includes a text message display space and/or a function card display space; and the target message display space does not overlap the text message display space and/or the function card display space.

According to one or more embodiments of the present disclosure, the target message display space has a portion in the first direction that is located behind the text message display space and/or the function card display space, and the first direction is the direction in which the video image is oriented.

According to one or more embodiments of the present disclosure, a rendering level of the target message is lower than a rendering level of a text message or a function card in the virtual reality space.

According to one or more embodiments of the present disclosure, when a user triggers one or more first message sending operations successively and a time interval between two adjacent first message sending operations does not exceed a preset time interval, the first message sending operations correspond to different first target messages, and the first target messages have different message movement end points.

According to one or more embodiments of the present disclosure, when a user triggers one or more first message sending operations successively and a time interval between two adjacent first message sending operations does not exceed a preset time interval, the first message sending operations correspond to identical first target messages, and the first target messages have identical message movement end points.

The information interaction method according to one or more embodiments of the present disclosure further includes: displaying the first identifier in the virtual reality space, the first identifier being used for displaying a number of first target messages currently sent in real time.

According to one or more embodiments of the present disclosure, when the user triggers the first message sending operation and the second message sending operation successively and a time interval between the first message sending operation and the second message sending operation is greater than a preset time interval, a message movement path of the first target message corresponding to the first message sending operation is different from a message movement path of the second target message corresponding to the second message sending operation.

The information interaction method according to one or more embodiments of the present disclosure further includes: rendering a preset animation effect based on a movement path of the target message.

According to one or more embodiments of the present disclosure, an information interaction apparatus is provided and includes a space display unit, a message determination unit, a start point determination unit and a message movement unit. The space display unit is configured to display a virtual reality space, and the virtual reality space includes a video image display space for displaying a video image. The message determination unit is configured to determine a target message in response to a message sending operation. The start point determination unit is configured to determine a message movement start point of the target message based on the message sending operation. The message movement unit is configured to move the target message in the virtual reality space based on the message movement start point.

According to one or more embodiments of the present disclosure, an electronic device is provided and includes at least one memory and at least one processor. The memory is configured to store program codes. The processor is configured to call the program codes stored in the memory to cause the electronic device to execute the information interaction method according to one or more embodiments of the present disclosure.

According to one or more embodiments of the present disclosure, a non-transitory computer storage medium is provided. The non-transitory computer storage medium stores program codes, when the program codes are executed by a computer device, the computer device is caused to execute the information interaction method according to one or more embodiments of the present disclosure.

The foregoing descriptions are merely preferred embodiments of the present disclosure and explanations of the applied technical principles. A person skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. An information interaction method, comprising:

displaying a virtual reality space, the virtual reality space comprising a video image display space for displaying a video image;

determining a message in response to a message sending operation;

determining a message movement start point of the message based on the message sending operation; and moving the message in the virtual reality space based on the message movement start point, wherein, when a user triggers a first message sending operation and a second message sending operation successively and a time interval between the first message sending operation and the second message sending operation is greater than a first time interval, a message movement path of a first message corresponding to the first message sending operation is different from a message movement path of a second message corresponding to the second message sending operation.

2. The method according to claim 1, wherein when the message sending operation comprises an operation with respect to a preset message editing interface displayed in the virtual reality space, the determining a message movement start point of the message comprises: determining the message movement start point of the message based on a position of the message editing interface in the virtual reality space.

3. The method according to claim 1, wherein when the message sending operation comprises an operation with respect to a virtual reality control device, the determining a message movement start point of the message comprises: determining the message movement start point of the message based on a position of the virtual reality control device in the virtual reality space.

4. The method according to claim 1, further comprising: determining a message movement end point of the message in response to the message sending operation, wherein the moving the message in the virtual reality space based on the message movement start point comprises: moving the message in the virtual reality space based on the message movement start point and the message movement end point.

5. The method according to claim 4, wherein when the message sending operation comprises an operation with respect to a virtual reality control device, the determining a message movement end point of the message comprises:

determining the message movement end point of the message based on a direction to which the virtual reality control device points.

6. The method according to claim 4, wherein the virtual reality space further comprises a message display space, and the message movement end point is located in the message display space.

7. The method according to claim 6, wherein the message display space is located in front of the video image display space in a first direction, and the first direction is a direction in which the video image is oriented.

8. The method according to claim 7, wherein an orthographic projection of the message display space on the video image display space is located outside a central region of the video image display space.

9. The method according to claim 7, wherein the virtual reality space further comprises a text message display space and/or a function card display space; and the message display space does not overlap the text message display space and/or the function card display space.

10. The method according to claim 9, wherein in the first direction, the message display space has a portion that is located behind the text message display space and/or the function card display space, and the first direction is the direction in which the video image is oriented.

11. The method according to claim 1, wherein a rendering level of the message is lower than a rendering level of a text message or a function card in the virtual reality space.

12. The method according to claim 4, wherein when a user triggers one or more first message sending operations successively and a time interval between two adjacent first message sending operations does not exceed the first time interval, the first message sending operations correspond to different first messages, and the first messages have different message movement end points.

13. The method according to claim 4, wherein when a user triggers one or more first message sending operations successively and a time interval between two adjacent first message sending operations does not exceed the first time interval, the first message sending operations correspond to identical first messages, and the first messages have identical message movement end points.

14. The method according to claim 13, further comprising:

displaying a first identifier in the virtual reality space, the first identifier being used for displaying a number of first messages currently sent in real time.

15. The method according to claim 1, further comprising: rendering a preset an animation effect based on a movement path of the message.

16. An electronic device, comprising:

at least one memory and at least one processor, wherein the memory is configured to store program codes, and the processor is configured to call the program codes stored in the memory, to cause the electronic device to execute an information interaction method, and the information interaction method comprises:

displaying a virtual reality space, the virtual reality space comprising a video image display space for displaying a video image;

determining a message in response to a message sending operation;

determining a message movement start point of the message based on the message sending operation; and moving the message in the virtual reality space based on the message movement start point, wherein, when a user triggers a first message sending operation and a second message sending operation successively and a time interval between the first message sending operation and the second message sending operation is greater than a first time interval, a message movement path of a first message corresponding to the first message sending operation is different from a message movement path of a second message corresponding to the second message sending operation.

17. A non-transitory computer storage medium, wherein the non-transitory computer storage medium stores program codes, when the program codes are executed by a computer device, the computer device is caused to execute an information interaction method, and the information interaction method comprises:

displaying a virtual reality space, the virtual reality space comprising a video image display space for displaying a video image;

determining a message in response to a message sending operation;

determining a message movement start point of the message based on the message sending operation; and moving the message in the virtual reality space based on the message movement start point, wherein, when a user triggers a first message sending operation and a second message sending operation successively and a time interval between the first message sending operation and the second message sending operation is greater than a first time interval, a message movement path of a first message corresponding to the first message sending operation is different from a message movement path of a second message corresponding to the second message sending operation.

18. The electronic device according to claim 16, wherein when the message sending operation comprises an operation with respect to a message editing interface displayed in the virtual reality space, the determining a message movement start point of the message comprises: determining the message movement start point of the message based on a position of the message editing interface in the virtual reality space.

19. The electronic device according to claim 16, wherein when the message sending operation comprises an operation with respect to a virtual reality control device, the determining a message movement start point of the message comprises: determining the message movement start point of the message based on a position of the virtual reality control device in the virtual reality space.

20. The electronic device according to claim 16, wherein the information interaction method further comprises: determining a message movement end point of the message in response to the message sending operation, wherein the moving the message in the virtual reality space based on the message movement start point comprises: moving the message in the virtual reality space based on the message movement start point and the message movement end point.

* * * * *